United States Patent

Suarez et al.

[11] Patent Number: 6,062,012
[45] Date of Patent: May 16, 2000

[54] CUTTING DEVICE FOR AGRICULTURAL MACHINES

[76] Inventors: Alfonso Alberto Suarez, Fournier 2793, Cordoba Provincia Córdoba; Antonio Gomariz, Roque Sanez Peña 361, Rio Tercero Córdoba, both of Argentina

[21] Appl. No.: 09/083,107

[22] Filed: May 22, 1998

[51] Int. Cl.$^7$ .................................................. A01D 34/30
[52] U.S. Cl. .............................................. 56/257; 56/297
[58] Field of Search .................. 56/297, 296, 259, 56/305, 257

[56] References Cited

U.S. PATENT DOCUMENTS

| Re. 33,546 | 3/1991 | O'Halloran | 56/305 |
|---|---|---|---|
| 94,251 | 8/1869 | Smith | 56/297 |
| 1,017,863 | 2/1912 | Fulton | 56/297 |
| 1,182,899 | 5/1916 | Enders | 56/297 |
| 1,424,617 | 8/1922 | Campbell et al. | 56/297 |
| 1,635,050 | 7/1927 | McKellar | 56/275 |
| 1,644,962 | 10/1927 | Swickard | 56/297 |
| 1,647,867 | 11/1927 | Hutsell | 56/259 |
| 2,528,659 | 11/1950 | Krause | 56/298 |
| 3,151,434 | 10/1964 | Hamel | 56/296 |
| 3,444,676 | 5/1969 | Hale et al. | 56/296 |
| 3,463,018 | 8/1969 | Hale et al. | 74/60 |
| 3,508,388 | 4/1970 | Buchholz | 56/297 |
| 3,577,716 | 5/1971 | McCarty et al. | 56/297 |
| 4,198,803 | 4/1980 | Quick et al. | 56/296 |
| 4,446,683 | 5/1984 | Rempel et al. | 56/296 |
| 4,909,025 | 3/1990 | Reissig et al. | 56/257 |
| 4,910,946 | 3/1990 | Underwood | 56/14.4 |

*Primary Examiner*—Thomas B. Will
*Assistant Examiner*—Arpad Fabian Kovacs
*Attorney, Agent, or Firm*—Sterne, Kessler, Goldstein & Fox P.L.L.C.

[57] ABSTRACT

A cutting device for agricultural machines comprising an upper cutting blade, a lower cutting blade, between the upper and lower cutting blades a separating plate is arranged, a counterblade fixed to the chassis of the agricultural machine, a driving mechanism for driving the upper and lower cutting blades with an alternative linear movement, each upper and lower cutting blade comprises a set of individual blades separated between each other, the counterblade comprises a "U" shaped fixed counterblade wherein each arm of the U-shaped counterblade defines an individual counterblade comprising an upper portion and a lower portion, wherein the upper portion is arranged above the upper cutting blade and the lower portion is arranged below the lower cutting blade whereby a shearing effect is created between each upper and lower cutting blades and the fixed counterblade.

9 Claims, 4 Drawing Sheets

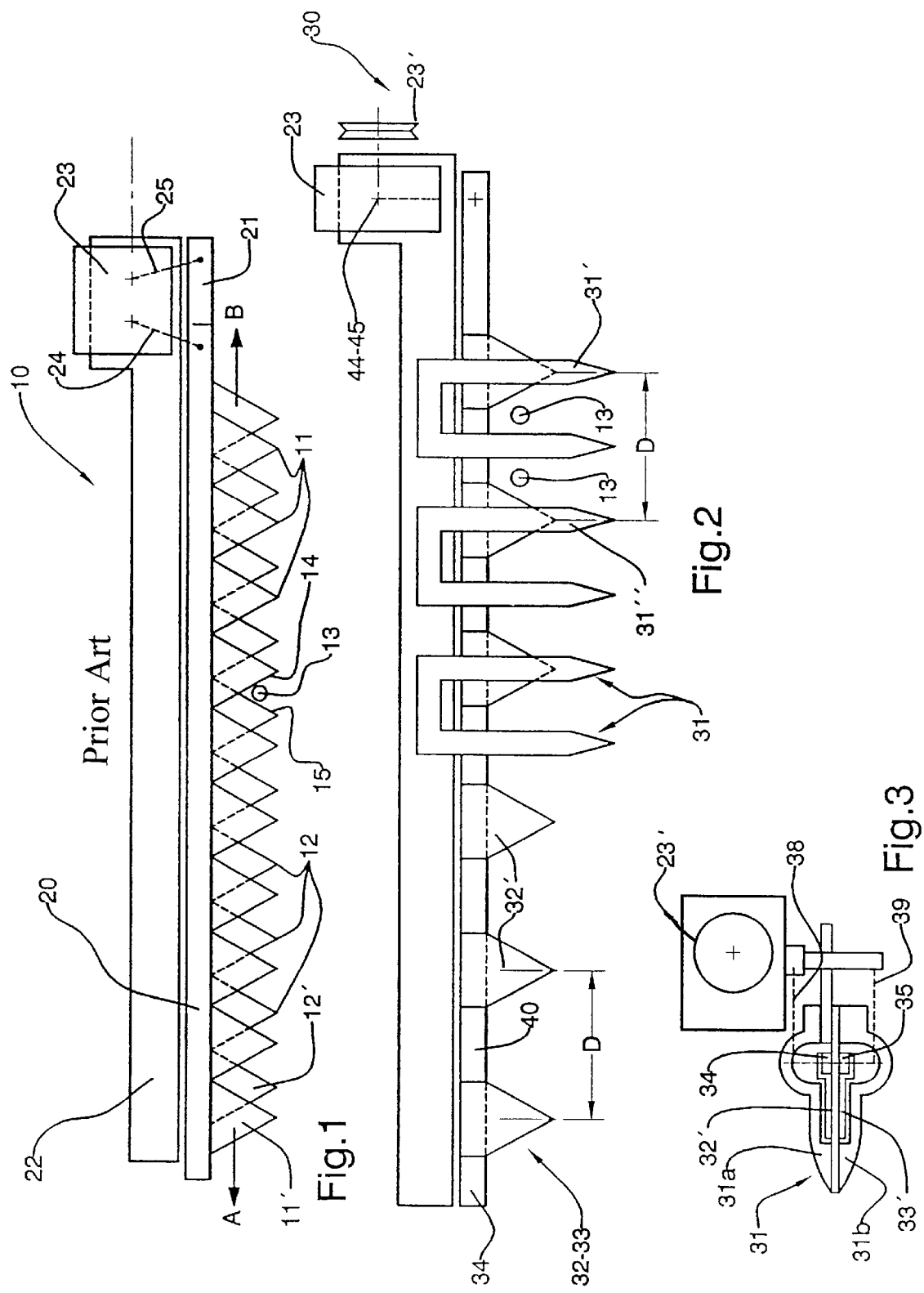

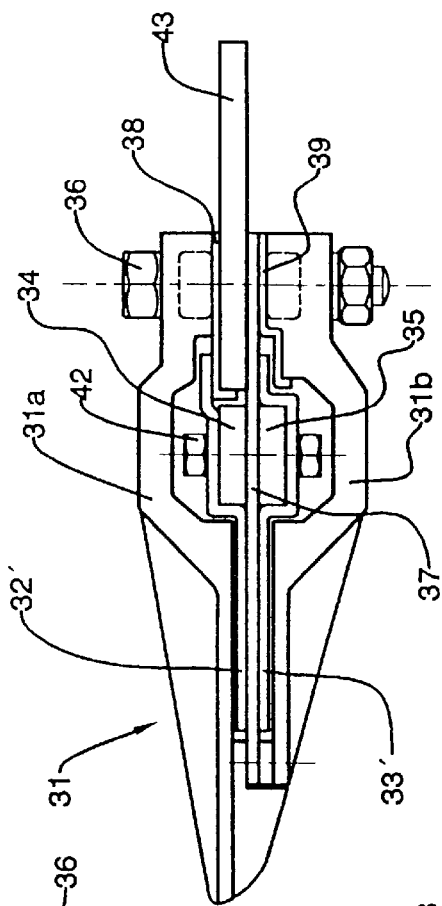
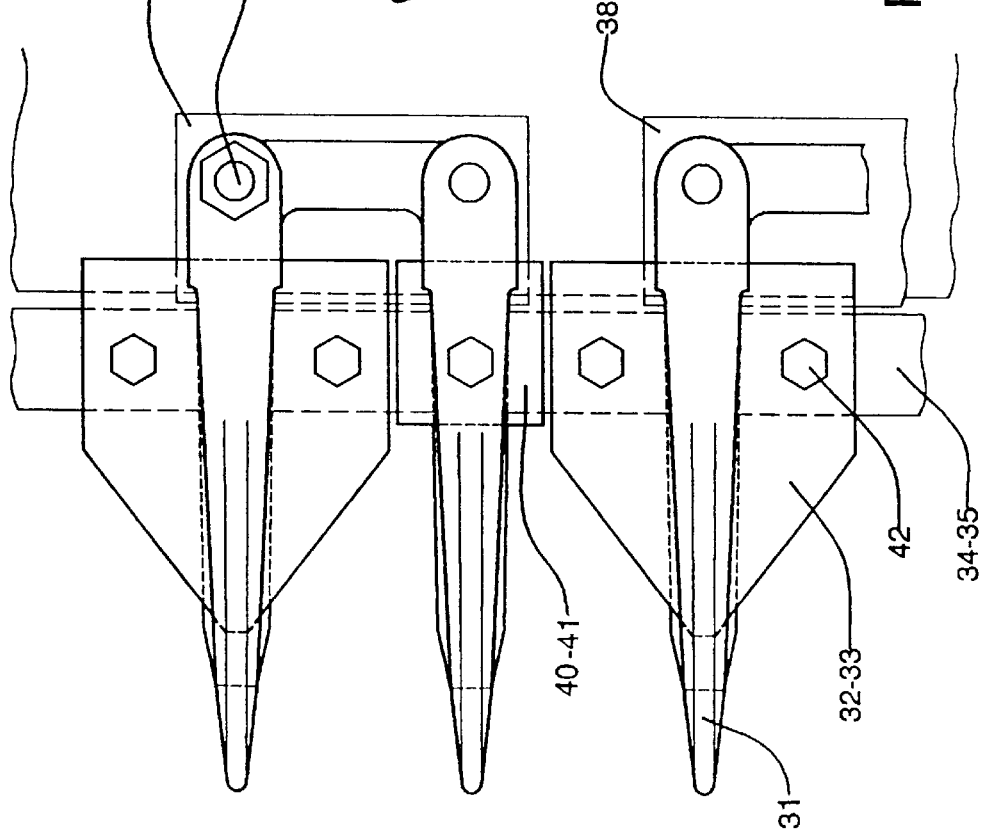
Fig.5
Fig.4

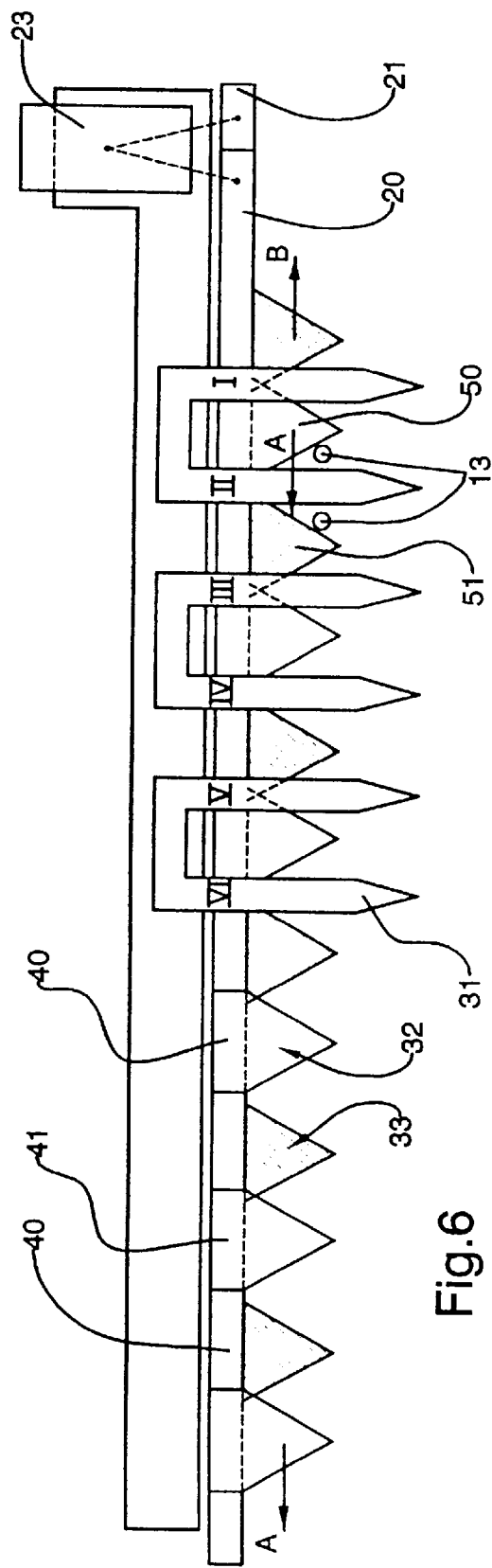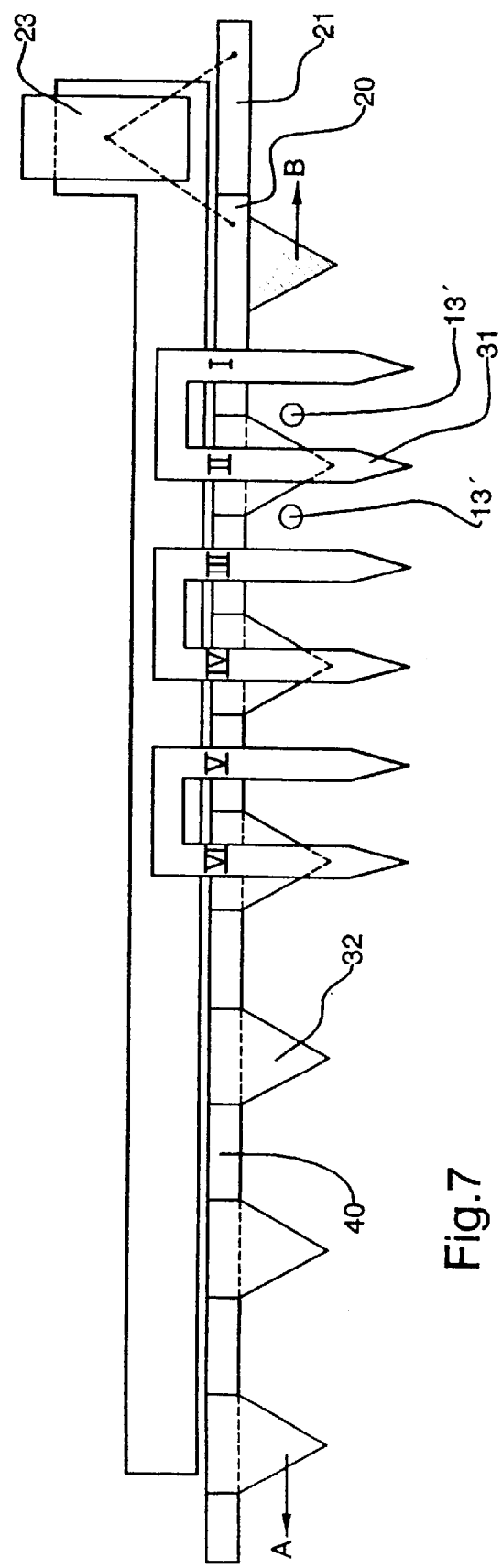

CUTTING DEVICE FOR AGRICULTURAL MACHINES

FIELD OF THE INVENTION

The present invention is related to improvements in agricultural machines, and more particularly refers to a cutting device for agricultural machines, especially for harvester machines. Even more particularly, the present invention refers to a cutting device capable of being installed in a harvester headstock including two cutting blades and a fixed counterblade.

BACKGROUND OF THE INVENTION

In the prior art, there are several cutting devices for harvester machines. Basically, a cutting device consists of two cutting blades overlapping each other, each of which comprises several knife sections secured to a long knife bar. Once the upper knife bar (and consequently the upper knife sections) moves to the right, the lower bar moves to the left, and due to the overlapping relationship between the knife sections a shearing effect is thus created. Because this cutting device is installed on the front part of a harvester machine, the shearing effect cuts cereal and forage plants to be harvested. Though harvester machines are the objects of several improvements relating to cutting device drive mechanisms, blade design, and others, an improved cutting device for reducing crop loss during the harvest process is still a market need.

There are several patents teaching the design and function of cutting blades arrangements, driving mechanisms, blade designs, etc. For instance U.S. Pat. No. 1,017,863 of Fulton; U.S. Pat. No. 1,182,899 of Enders; U.S. Pat. No. 1,424,617 of Cambell et al.; U.S. Pat. No. 1,635,050 of McKellar; U.S. Pat. No. 1,644,962 of Swickard, U.S. Pat. No. 2,528,659 of Krause and U.S. Pat. No. 4,909,025 of Reissig et al. are examples thereof. These patents are cited only as a reference. Even when the inventions described in these documents involve improvements on cutting devices, a significant decreasing in crop loss is not achieved with any of them. This loss is created due to the defective plant stems cutting. That is, not all plant stems are well cut when the harvester machine harvests crops. Therefore the crop is not properly harvested and a significant loss is then created.

Ernest O. Hutsell describes in U.S. Pat. No. 1,647,867 a lawn mower comprising a cutting device which includes the combination of a frame, two knife bars reciprocally mounted transversely of a frame, two rods mounted above and parallel to the respective knife bars, guides in which the rods are reciprocal, and means for reciprocating the moving knife bars. Even though the mechanisms involved are useful for a lawn mower, the hard work usually involved in crop harvesting makes the become said mechanism not useful for this task. One object of the present invention resides on a new and improved cutting device for harvester machines comprising a combination of two moving cutting blades set overlapping each other, and a fixed counterblade. The shearing effect, explained above, is created between each set of moving cutting blades and the fixed counterblade. This arrangement allows an improved shearing effect by which crop loss is thus avoided.

Another object of the present invention resides in an improved harvester machine including a cutting device through which all plant stems are cut and thus crop loss is avoided.

SUMMARY OF THE INVENTION

The present invention comprises a cutting device forming part of the harvester machine headstock transversely mounted on the headstock, and includes two moving cutting blades, a fixed counterblade and an apparatus for driving the cutting blades with an alternative linear movement. This cutting device comprises an upper cutting blade made of a first set of individual trapezoid-shaped blades fixed with a rectilinear arrangement to a first supporting steel bars. A second lower cutting blade comprising a second set of individual trapezoid-shaped blades is fixed with a rectilinear arrangement to a second supporting steel bar. Between each individual trapezoid-shaped blade of each first and second set of individual blades there is a gap. The steel bar of rectangular cross section includes a one end, a bolt at 90° in relation with the bar. The bolt connects the bar with a driving arm of said driving apparatus. The lower blade is identical and symmetrical to the upper blade, said fixed counterblade comprises a set of individual U-shaped fixed blades with a rectilinear arrangement comprising two parallel forward counteredges and a transverse rearward bar. The set of counterblades are fixed to a supporting bar parallel and behind the blades. Each counterblade defines a guide and support means for the blades.

BRIEF DESCRIPTION OF DRAWINGS

FIG. 1 is a top plan schematic illustration of a cutting device according to the prior art mentioned in the introduction hereto.

FIG. 2 is a top plan view of a cutting device according to a preferred embodiment of the present invention.

FIG. 3 schematically shows a cross section view of the cutting device of FIG. 2.

FIG. 4 is a top plan view of a portion of the present cutting device wherein the position of each element of the upper cutting blade coincide with the position of each element of the lower cutting blade.

FIG. 5 is an elevational side view of one element of the present cutting device, wherein upper and lower blades and a fixed counterblade are clearly shown.

FIGS. 6–9 are schematic top plan views of the present cutting device illustrating the operation thereof.

DESCRIPTION OF THE INVENTION

Figure 8:
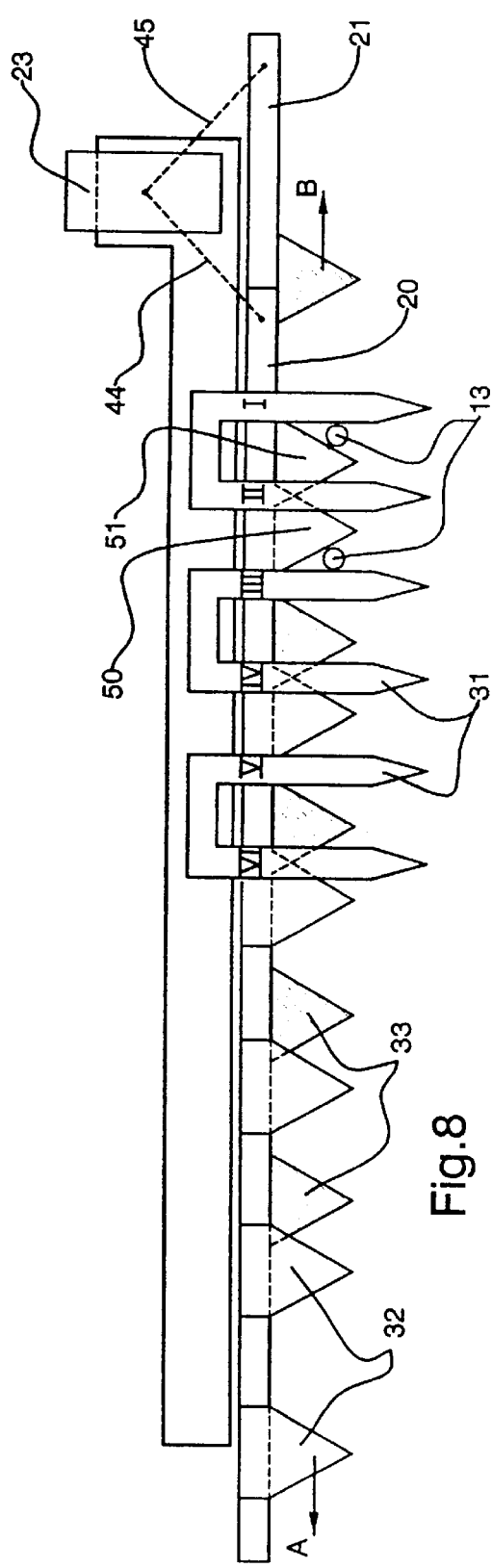

FIG. 1 illustrates a prior-art cutting device 10 comprising an upper cutting blade 11 fixed to a supporting steel bar 20 and, a lower cutting blade 12 fixed to a supporting steel bar 21. The blades are further supported by a supporting chassis 22 and driven by a driving apparatus 23 comprising a first driving shaft 24 for driving the upper cutting blade 11 and a second driving shaft 25 for driving the lower cutting blade 12. The upper cutting blade 11 moving to the left as indicated by arrow A and the lower cutting blade 12 moving to the right as indicated with arrow B are in an off-set position ready for cutting a plant stem 13 by a shearing effect created between cutting edge 14 of one element of upper cutting blade 11 and cutting edge 15 of one element of lower cutting blade 12. There are no fixed elements with which the blades can interact, the present invention provides a fixed counterblade to which the plant stem is to be rested to be cut.

FIGS. 2 and 3 schematically illustrate a cutting device 30 of the present invention comprising a fixed, U-shaped counterblade 31 having two arms, each forming an individual counterblade. In FIG. 2, on upper blade 32 coincides with a lower 33. This counterblade 31 is one of the novel aspects of the present invention, together with the blades arrangement, as it will be explained in detail below.

Cutting device 30 comprises an upper cutting knives 32 comprising a set of individual cutting blades 32' and a lower cutting blade 33 also comprising a set of individual cutting knives 33'. Unlike the prior art cutting blades the present invention proposes that a gap "D" is defined between individual knives 32'–33' in the upper and lower cutting blades 32–33, as indicated in FIG. 2. Therefore individual blades are not arranged one beside the other, and the distance D is also equal to the distance between first counterblade 31' and the third one 31".

The upper blade 32 comprises an upper supporting bar 34 to which individual upper knives 32' are fixed. The lower blade 33 comprises a lower supporting bar 35 to which said individual knives 33' are fixed. Each counterblade 31 comprises an upper piece 31a and a lower piece 31b, joined together and to a chassis 43 by a fastening bolt 36 as seen in FIG. 5. Inside each counterblade 31, between and separating blades 32–33 there is arranged a separating plate 37. Upper knife 32' includes a wearing plate 38 and lower blade 33 also includes a corresponding wearing plate 39. Separating pieces 40–41 are arranged between blades 32–33 and a fasten bolts 42 join blades 32–33 and separating pieces 40–41.

The driving apparatus 23 basically comprises an engine (not illustrated) for driving a driving mechanism 26 comprised of a pulley 23' which in turn drives two concentric shafts 44–45 turning at opposite directions, and a pair of driving shafts or arms 24–25, as in FIG. 1. This driving apparatus 23 for moving cutting blades 32–33 with an opposite alternating linear movement is not described in detail since it is a well-known means in the art.

FIGS. 1, 6, 7, 8 and 9 are useful for understanding the way used by the present cutting device for cutting plant stems to be harvested and the differences between this device and the prior-art cutting devices already cited above. Unless stated on the contrary, and in order to understand the embodiment illustrated in the accompanying drawings, a one-sense movement of each blade will only be considered, that is half turn of driving apparatus's pulley 23', even when it is well known that each blade (upper 32 and lower 33) is moved according to an alternative linear movement (from left to right and vice versa). In the cutting devices of the prior art a shearing effect is created between two blades. Therefore a plant stem 13 (FIG. 1) is cut due to the shearing effect created between an upper blade 11 and a lower blade 12, particularly between a first cutting edge 14 of the upper cutting blade 11 and a second cutting edge 15 of the lower cutting blade 12. Therefore there is only one shearing effect for each pulley turn of the driving mechanism 23.

One of the advantages of the present invention resides on the fact that the inventor has surprisingly discovered that for each revolution of the pulley, four different shearing effects can be created due to the combination of two moving blades and a fixed counterblade.

Figure 9:
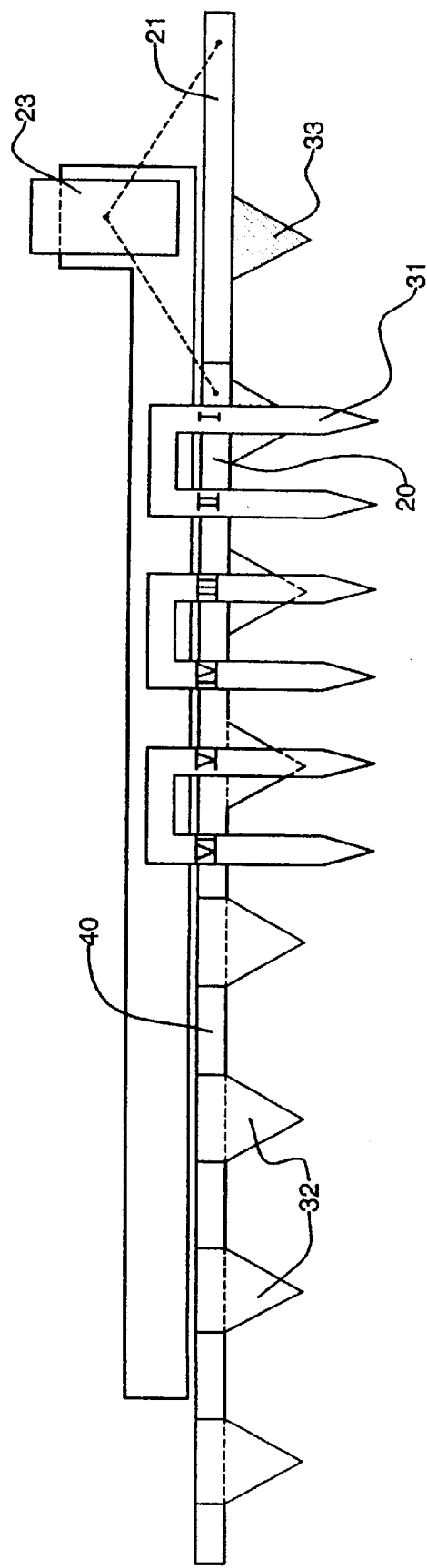

Turning now to FIGS. 6–9 it is shown how the stems are cut with half revolution of the pulley 23' of the driving mechanism 23. For illustration purposes only the different parts of each fixed counterblades 31 are indicated with I, II, III, VI, V and VI in FIGS. 6–9. With only half revolution of the pulley a first cutting knife 50 of the upper blade 32 (FIG. 6) is moved from counterblade I to counterblade III and simultaneously a second cutting knife 51 of the lower blade 33 is moved from counterblade III to counterblade I, therefore plant stems 13 entering in the space comprised between counterblades I and II and between counterblades II and III are cut due to the shearing effect created between cutting knives 50 and 51 and the counterblade II. FIG. 7 shows the moment in which the position of upper blades 32 and lower blades 33 coincides with the position of counterblade II, in this moment new stems 13' enter in the space between the blades which are cut due to the shearing effect created between the cutting knives 50–51 and the counterblades III and I respectively as illustrated in FIG. 8. FIG. 9 illustrates the end of this linear movement of the upper and lower blades 32–33, that is upper cutting knife 50 was moved from counterblade I to counterblade III and lower cutting knife 51 was moved from counterblade III to counterblade I, thus four different shearing effects were created with only half revolution of the pulley 23' of the driving mechanism 23 increasing the efficiency of this cutting task.

It is clearly understood that the novelty of the present invention resides on the combination of the following elements:

combining two moving upper and lower cutting blades with a fixed counterblade, defining a gap between each individual cutting blade and the next one of each upper and lower cutting blades, that is the individual cutting knives are not arranged one next to the other, there is a gap between each other, equal to the distance between three counterblades, with only one half turn of the driving mechanism's pulley each blade runs a space comprised between three counterblades with only one half turn of the driving mechanism's pulley four different shearing effects are created.

We claim:

1. A cutting device for agricultural machines wherein said cutting device comprises:
   an upper cutting blade,
   a lower cutting blade,
   a separating plate disposed between said upper and lower cutting blades,
   a counterblade transversely fixed to a chassis of said agricultural machine,
   a driving mechanism for driving said upper and lower cutting blades with an alternative linear movement, wherein each upper and lower cutting blades is a set of individual cutting knives separated between each other,
   wherein said counterblade comprises a "U" shaped fixed counterblade having two arms wherein each arm of said U-shaped counterblade defines an individual counterblade comprising an upper portion and a lower portion, and
   wherein the upper portion is arranged above said upper cutting blade and said lower portion is arranged below said lower cutting blade whereby a shearing effect is created between each upper and lower cutting blade and said fixed counterblade.

2. A cutting device for agricultural machines in accordance with claim 1, wherein said individual cutting knives of said upper and lower cutting blades are separated a distance equal to the distance between three individual fixed counterblades.

3. A cutting device for agricultural machines in accordance with claim 1, wherein said driving mechanism comprises a a pulley connected to an engine and a pair of driving arms for driving said pulley wherein one of said driving arms is connected to a first supporting bar wherein said set of individual upper cutting knives are fixed, and the other driving arm is connected to a second supporting bar wherein said set of individual lower cutting knives are fixed.

4. A cutting device for agricultural machines in accordance with claim 3, wherein with only one half turn of said pulleys each upper and lower cutting blade runs a space equal to the space comprised between three fixed individual counterblades.

5. A cutting device for agricultural machines in accordance with claim 3, wherein with only one half turn of said pulley, four different shearing effects are created.

6. A method for cutting a plant stem comprising the steps of providing an agricultural machine with a cutting device comprising:

an upper cutting blade, a lower cutting blade, and a separating plate arranged between said upper and lower cutting blades, a counterblade fixed to a chassis of said agricultural machine, a driving mechanism for driving said upper and lower cutting blades with an alternative linear movement, wherein each upper and lower cutting blades comprises a set of individual cutting knives separated between each other, and said counterblade comprises a "U" shaped fixed counterblade having two arms and creating a space between the arms wherein each arm of said U-shaped counterblade defines an individual counterblade comprising an upper portion and a lower portion, wherein said upper portion of said counterblade is arranged above said upper cutting blade and said lower portion of said counterblade is arranged below said lower cutting blade, cutting the plant stems entering a space between said individual counterblades by creating a shearing effect between:

a first counterblade and said upper cutting blades;

a second counterblade and said upper cutting blade, a second counterblade and said lower cutting blade;

a third counterblade and said lower cutting blade;

said third counterblade and said upper cutting blade, and said first counterblade and said lower cutting blade.

7. The method of claim 6, further comprising the step of running each upper and lower cutting blade in a space equal to the space comprised between three fixed individual counterblades with only one half turn of said pulley.

8. The method of claim 6, comprising the step of creating with only one half turn of said pulley, four different shearing effects.

9. An improved harvester machine including a cutting device comprising:

an upper cutting blade, a lower cutting blade, a separating plate arranged between said upper and lower cutting blades, a counterblade transversely fixed to a chassis of said harvester machine, and a driving mechanism for driving said upper and lower cutting blades with an alternative linear movement, wherein each upper and lower cutting blade comprises a set of individual cutting knives separated between each other, wherein said counterblade comprises a "U" shaped fixed counterblade having two arms, wherein each arm of said U-shaped counterblade defines an individual counterblade comprising an upper portion and a lower portion, wherein the upper portion of said counterblade is arranged above said upper cutting blade and said lower portion of said counterblade is arranged below said lower cutting blade whereby a shearing effect is created between each upper and lower cutting blade and said fixed counterblade.

* * * * *